United States Patent
Turpin et al.

(10) Patent No.: US 10,314,224 B2
(45) Date of Patent: Jun. 11, 2019

(54) MULTIPLE HARVESTER PLANNER

(71) Applicants: Autonomous Solutions, Inc., Mendon, UT (US); CNH Industrial America LLC, New Holland, PA (US)

(72) Inventors: Bret T. Turpin, Wellsville, UT (US); Daniel J. Morwood, Petersboro, UT (US); Christopher Alan Foster, Mohnton, PA (US)

(73) Assignees: Autonomous Solutions, Inc., Mendon, UT (US); CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/085,295

(22) Filed: Mar. 30, 2016

(65) Prior Publication Data
US 2017/0280614 A1 Oct. 5, 2017

(51) Int. Cl.
*A01B 79/00* (2006.01)
*G06Q 10/06* (2012.01)
*G06Q 50/02* (2012.01)

(52) U.S. Cl.
CPC ....... *A01B 79/005* (2013.01); *G06Q 10/0633* (2013.01); *G06Q 50/02* (2013.01)

(58) Field of Classification Search
CPC ......... E02F 9/2025; E02F 9/26; E02F 9/2045; A01B 79/005; A01B 69/008
USPC .......................................................... 701/50
See application file for complete search history.

(56) References Cited

U.S. PATENT DOCUMENTS

| | | | |
|---|---|---|---|
| 6,128,574 A | 10/2000 | Diekhans |
| 6,336,051 B1 | 1/2002 | Pangels et al. |
| 7,343,222 B2 | 3/2008 | Solomon |
| 7,610,122 B2 | 10/2009 | Anderson |
| 8,639,408 B2 | 1/2014 | Anderson |
| 8,738,238 B2 | 5/2014 | Rekow |

(Continued)

FOREIGN PATENT DOCUMENTS

WO 2015038751 A1 3/2015

OTHER PUBLICATIONS

"Functionality", High-level Dashboard-style Report Summaries, CanePro Management Software, Jul. 23, 2015 (4 pages).
(Continued)

*Primary Examiner* — Maceeh Anwari
(74) *Attorney, Agent, or Firm* — Rickard Demille; Peter Zacharias

(57) ABSTRACT

A system has an algorithm for organizing the actions of agricultural machines and servicing vehicles in a field. The algorithm divides the field into logical chunks of work, including at least one swath within at least one headland and within at least one land, which it then assigns to the agricultural machines in order. Priority is first given to working the headlands, then to working swaths within lands where an agricultural machine can perform its function while remaining accessible to the servicing vehicles. When the agricultural machine is in an area where it is not accessible to a servicing vehicle and needs service, the agricultural machine creates an impromptu servicing area. This may be an area within a swath that the agricultural machine has cleared of crops in order to provide the servicing vehicle, such as a haul vehicle or grain cart, access to the agricultural machine and space to turn around.

15 Claims, 2 Drawing Sheets

(56) References Cited

U.S. PATENT DOCUMENTS

| | | |
|---|---|---|
| 2005/0273253 A1* | 12/2005 | Diekhans .............. G01C 21/20 |
| | | 701/50 |
| 2007/0271002 A1 | 11/2007 | Hoskinson et al. |
| 2010/0042297 A1 | 2/2010 | Foster et al. |
| 2011/0213531 A1 | 9/2011 | Farley et al. |
| 2013/0046525 A1 | 2/2013 | Ali et al. |
| 2013/0166344 A1 | 6/2013 | Grothaus et al. |
| 2014/0129146 A1 | 5/2014 | Romier |
| 2015/0142250 A1 | 5/2015 | Cavender-Bares et al. |
| 2015/0242799 A1 | 8/2015 | Seki et al. |
| 2015/0323913 A1 | 11/2015 | Gilmore et al. |
| 2015/0351320 A1 | 12/2015 | Takahara et al. |

OTHER PUBLICATIONS

"Harvest", Trimble Navigation Limited, Jul. 23, 2015 (2 pages).
"Rowbot", Rowbot Demo Homepage, Rowbot Systems, Jul. 23, 2015 (6 pages).
International Search Report and Written Opinion for PCT Application No. PCT/US2017/024921 dated Jun. 30, 2017 (11 pages).

\* cited by examiner

MULTIPLE HARVESTER PLANNER

BACKGROUND OF THE INVENTION

1. Field of the Invention

The present invention relates to agricultural machines such as combines, forage harvesters, windrowers, harvesting machines, crop preparation machines, tractors, and implements, and, more particularly, to agricultural machines that perform one or more agricultural functions in a field wherein multiple such agricultural machines operate in coordination to perform the one or more agricultural functions.

2. Description of the Related Art

An agricultural harvester known as a "combine" is historically termed such because it combines multiple harvesting functions with a single harvesting unit, such as picking, threshing, separating and cleaning. A combine removes the crop from a field, and performs a threshing operation on the crop to remove the grain, cleans it using a cleaning system, and temporarily stores it in an onboard grain tank. Non-grain crop material such as straw, chaff, and other debris is chopped and discharged out of the rear of the combine. When the grain tank of the combine becomes full, a haul vehicle or chaser cart into which the grain is to be unloaded, such as a semi-trailer, gravity box, straight truck, or the like, is positioned adjacent to or moves alongside the combine, and an unloading system on the combine is actuated to transfer the grain into the haul vehicle or chaser cart.

Often, multiple combines operate in a given field or group of fields in conjunction with one or more haul vehicles in order to harvest a crop in a timely and efficient fashion. This may be especially important in harvesting crops that have an optimum window of time for harvesting wherein yield and quality are at a maximum, or in agricultural operations involving large amounts of land in areas of unpredictable weather. Similarly, other agricultural operations may involve multiple agricultural machines working in coordinated fashion in order to accomplish an agricultural function in a field or group of fields. For example, forage harvesters harvest forage plants to make silage that is typically used for feed for livestock. Windrowers cut hay or grain crops such as wheat and form the cut crops into long narrow rows for drying and later pickup. Harvesting machines harvest various types of crops having particular harvesting needs, such as grapes or cotton. Tractors provide tractive effort and power to various kinds of implements that perform agricultural functions such as tilling, planting, seeding, spraying, mowing, raking, or baling. At any one time, multiple such agricultural machines may be engaged in one or more agricultural functions within the same field or group of fields.

The coordination of the movements and actions of multiple agricultural machines in a field or group of fields is often largely a manual process, relying upon the experience and cooperation of operators. This being the case, it is not uncommon for there to be delays, interruptions, and inefficiencies in performing the one or more agricultural functions. For example, several combines may be harvesting in a field, such that each combine has on both sides of it areas of unharvested crop. One combine may require unloading so that it can proceed no further in its area without overfilling. Because multiple combines are in the field, such that there is not wide open space on one side of the combine as would be the case with a single combine operation, there may be insufficient space for a haul vehicle or chaser cart to approach the combine, receive the harvested crop, and turn around to exit the field. Further, there may not be space for the combine itself to turn away in order to approach the haul vehicle or chaser cart. As a result, the combine that requires unloading may have to wait until sufficient space has been cleared of crops by another combine, or may have to back entirely out of its row, in order to unload. Alternately, there may be sufficient space alongside each of the combines in the field for unloading, but the combines may be working at some distance from each other, so that the haul vehicles or chaser carts must travel between combines, resulting in inefficient use of time and fuel.

What is needed is a way to coordinate the movement and actions of multiple agricultural machines in a field or group of fields that minimizes delays, interruptions, and inefficiencies, that is robust in regards to variations in timing, vehicle configurations, and field arrangements and conditions, and that provides for the unloading or similar function of agricultural machines.

SUMMARY OF THE INVENTION

Embodiments of the present invention provide a system utilizing a planner or dispatch algorithm that coordinates the movements and activities of multiple agricultural machines such as harvesters performing an agricultural function such as harvesting crop in a field or fields in such a way as to minimize delays, interruptions, and inefficiencies. The planner or dispatch algorithm may further coordinate the movements and activities of service vehicles such as haul vehicles or chaser carts, in performing service functions in connection with the multiple agricultural machines, such as unloading. Each of the multiple agricultural machines and the service vehicles may receive direction from the planner or dispatch algorithm, which is directed to the operator thereof or to autonomous control systems where applicable. Embodiments of the present invention may involve the planner or dispatch algorithm running on a remote computer, or in one or more computers or controllers in one or more of the agricultural machines. Some embodiments of the planner or dispatch algorithm may receive status information from the multiple agricultural machines and service vehicles.

The planner or dispatch algorithm generally divides the field or fields into lands and headlands. The lands and headlands are further divided into logical chunks of work including swaths, or groups of rows, that may receive an agricultural function from an agricultural machine in a single pass, such as a number of rows of crop to be harvested by a combine. Each land and headland may include a set of logical chunks of work or swaths that are harvested together. Initially, the agricultural machines, as they are available, are first assigned to the logical chunks of work or swaths of the headlands of a given field to perform their agricultural function therein. Next, the agricultural machines, as they are available, are assigned to logical chunks of work or swaths within a land of the field giving preference to nearby lands that the agricultural machines can work by moving in directions placing the agricultural machines in orientations so as to allow service vehicles to be in position to service the agricultural machines while travelling over area that has already received the agricultural function. In the embodiment involving agricultural harvesters and haul vehicles or grain carts, this means giving preference to logical chunks of work or swaths within a land that the agricultural harvesters can continue to harvest while placing the unloading system of the harvester adjacent to a harvested area, the harvested area being either in a previously harvested swath of a headland or in a previously harvested swath of a land. If no such logical chunk of work or swath is available, the agricultural machines, as they are available, are assigned to logical chunks of work or swaths in the next land that is not already being worked by another agricultural machine. When an agricultural machine is directed by the planner or dispatch algorithm to begin work on a logical chunk of work or swath within a new land of the field, called "opening a land," it and any other agricultural machine also directed to work within the new land first cuts a logical chunk of work or swath down the approximate center of the newly opened land. The agricultural machines then work outward from the center of the land, as directed by the planner or dispatch algorithm, so that the unloading system or other serviceable function is directed towards the area having already received the agricultural function, such as having already had the crop removed in a harvesting operation.

If a given agricultural machine is performing an agricultural function upon a logical chunk of work or swath within a land that does not place it in an orientation that allows a service vehicle to be in a position to service the agricultural machine while travelling over an area that has already received the agricultural function, such as an agricultural harvester harvesting with unharvested swaths on either side when opening a land, and the agricultural machine requires servicing, such as unloading, the planner or dispatch algorithm may further be operable to direct the agricultural machine to create an impromptu servicing or unloading area, or cutout. In the embodiment involving agricultural harvesters and haul vehicles or grain carts, this may involve reversing for a distance and harvesting part of an adjoining swath to create space for the haul vehicle or chaser cart to unload the agricultural harvester and turn around. Once the space for an impromptu servicing or unloading area, or cutout, has been created, the agricultural harvester returns to the original swath so that the haul vehicle or chaser cart may unload the agricultural harvester while occupying the cutout.

The planner or dispatch algorithm according to the present invention is robust and capable of adjusting to changes and interruptions, reassigning the agricultural machines and service vehicles as necessary due to additional agricultural machines and service vehicles becoming available, such as from other fields or lands within a field where work has been completed, or due to agricultural machines and service vehicles becoming unavailable, such as due to breakdowns or needing to unload. Embodiments of the planner or dispatch algorithm of the present invention may adjust the assignment of logical chunks of work according to the capabilities of the agricultural machines. Alternately, embodiments of the planner or dispatch algorithm of the present invention may simply use a first come, first serve type of prioritization. Embodiments of the planner or dispatch algorithm of the present invention may further iteratively simulate the assignment of logical chunks of work or swaths within the headlands or lands of a field or fields to different permutations of available agricultural machines, in order to determine the most efficient assignment of such logical chunks of work or swaths according to the capabilities of the agricultural machines. In doing so, embodiments of the planner or dispatch algorithm of the present invention may further consider field geometry and/or field conditions.

Embodiments of the present invention may be applied to agricultural harvesters and haul vehicles or grain carts, as illustrated, or may be applied to other types of agricultural machines such as forage harvesters, harvesting machines, tractors and implements, and associated servicing vehicles performing servicing functions such as refueling, replenishing, or unloading.

The invention in one form is directed to a system for organizing the actions of agricultural machines. In the system, at least one agricultural machine performs a primary agricultural function in at least one field. At least one servicing vehicle performs a servicing function in connection with the at least one agricultural machine on an as-needed basis. An algorithm running on at least one computer divides the at least one field into logical chunks of work, including at least one swath within at least one headland and at least one swath within at least one land. The algorithm further determines the assignment of each of the at least one agricultural machines to perform its primary agricultural function upon the logical chunks of work in a prioritized order. The at least one agricultural machine is first assigned to perform its primary agricultural function upon the at least one swath within the at least one headland if all of the swaths within the at least one headland have not already received the primary agricultural function or are not already receiving the primary agricultural function from another of the at least one agricultural machines. The at least one agricultural machine is second assigned to perform its primary agricultural function upon one of the at least one swaths within one of the at least one lands that is already receiving the primary agricultural function from another of the at least one agricultural machines, and in which the at least one agricultural machine can perform the primary agricultural function in such an orientation that the at least one servicing vehicle can perform its servicing function in connection with the at least one agricultural machine by way of the at least one servicing vehicle passing over an area that has already received the primary agricultural function. The at least one agricultural machine is third assigned to perform its primary agricultural function upon one of the swaths within one of the at least one lands that has not already received the primary agricultural function or is not already receiving the primary agricultural function from another of the at least one agricultural machines, and in which the at least one agricultural machine cannot perform its primary agricultural function in such an orientation that the at least one servicing vehicle can perform its servicing function in connection with the at least one agricultural machine by way of the at least one servicing vehicle passing over an area that has already received the primary agricultural function.

The invention in another form is directed to a method for organizing the actions of agricultural machines, including several steps. The first step is providing at least one agricultural machine capable of performing a primary agricultural function in at least one field. The second step is providing at least one servicing vehicle capable of performing a servicing function in connection with the at least one agricultural machine on an as-needed basis. The third step is running an algorithm on at least one computer. The algorithm further takes several steps. The first step taken by the algorithm is dividing the at least one field into logical chunks of work, including at least one swath within at least one headland and at least one swath within at least one land. The second step taken by the algorithm is determining the assignment of each of the at least one agricultural machines to perform its primary agricultural function upon the logical chunks of work in prioritized order. The at least one agricultural machine is first assigned to perform its agricultural function upon the at least one swath within the at least one headland if all of the swaths within the at least one headland have not already received the primary agricultural function or are not already receiving the primary agricultural function from another of the at least one agricultural machines. The at least one agricultural machine is second assigned to perform its agricultural function upon one of the at least one swaths within one of the at least one lands that is already receiving the primary agricultural function from another of the at least one agricultural machines, and in which the at least one agricultural machine can perform its primary agricultural function in such an orientation that the at least one servicing vehicle can perform its servicing function in connection with the at least one agricultural machine by way of the at least one servicing vehicle passing over an area that has already received the primary agricultural function. The at least one agricultural machine is third assigned to perform its agricultural function upon one of the at least one swaths within one of the at least one lands that has not already received the primary agricultural function or is not already receiving the primary agricultural function from another of the at least one agricultural machines, and in which the at least one agricultural machine cannot perform its primary agricultural function in such an orientation that the at least one servicing vehicle can perform its servicing function in connection with the at least one agricultural machine by way of the at least one servicing vehicle passing over an area that has already received the primary agricultural function.

One advantage of the present invention is that it minimizes delays, interruptions, and inefficiencies by coordinating the movements and actions of multiple agricultural machines and servicing vehicles within the headlands or lands of a field. Another advantage is that it improves access to the agricultural machines by the servicing vehicles for coordinated activities such as unloading on the go. Still another advantage is that the present invention is robust in regards to variations in timing, vehicle configurations, and field arrangements and conditions.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
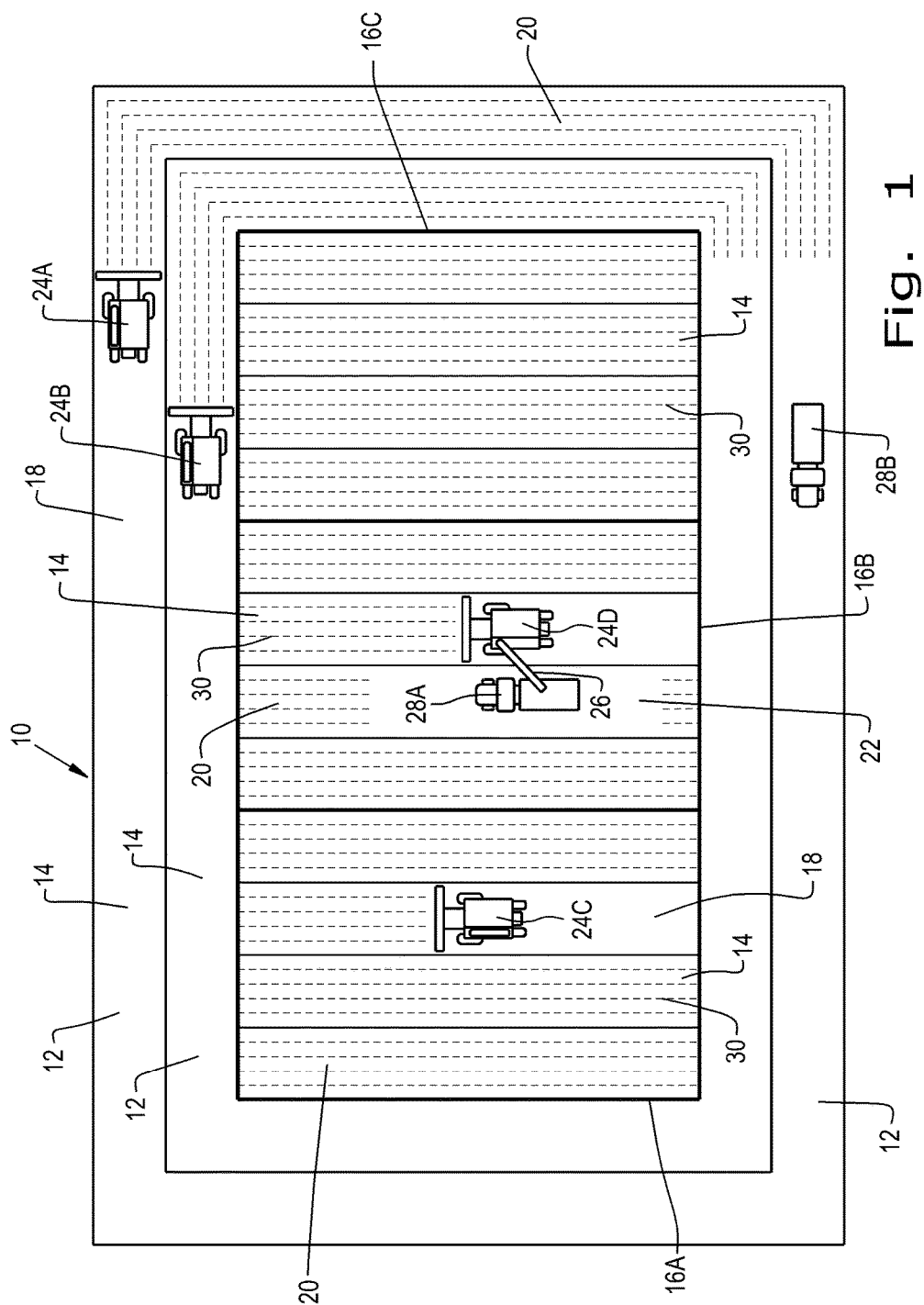
FIG. 1 illustrates a graphical representation of a field being harvested under the direction of a planner or dispatch algorithm according to an embodiment of the invention.

Referring now to the drawings, and more particularly to FIG. 1, there is shown a field 10 being harvested using multiple agricultural machines in the form of combines 24A, 24B, 24C, and 24D. The multiple agricultural machines perform a primary agricultural function upon the field 10, in the case of combines 24A, 24B, 24C, and 24D, the primary agricultural function being harvesting a crop. Service vehicles in the form of haul vehicle or chaser carts 28A and 28B perform service functions in connection with the multiple agricultural machines, in the case of haul vehicle or chaser carts 28A and 28B, the service function being unloading the combines 24A, 24B, 24C, and 24D as needed by way of an unloading system 26 that is part of each combine 24A, 24B, 24C, and 24D. Each of the combines 24A, 24B, 24C, and 24D and the haul vehicle or chaser carts 28A and 28B receives direction from a planner or dispatch algorithm 90 (not shown in FIG. 1). The planner or dispatch algorithm 90 may run on a remote computer (not shown in FIG. 1), or in one or more computers or controllers (not shown in FIG. 1) in one or more of the agricultural machines. The planner or dispatch algorithm 90 may use Global Positioning System (GPS) data in order to determine the position of the combines 24A, 24B, 24C, and 24D and the haul vehicle or chaser carts 28A and 28B, which may be compared with map and field data that is internal to the computer or computers, or may be provided from an external source.

The combines 24A, 24B, 24C, and 24D and the haul vehicle or chaser carts 28A and 28B may provide status information to the planner or dispatch algorithm 90 and/or receive direction from the planner or dispatch algorithm 90 by way of radio, telemetry, cellular, or electronic interface such as text, email, or Bluetooth, as non-limiting examples. Direction from the planner or dispatch algorithm 90 may be presented to the operator using visual or audio directions delivered by way of a hand held or in cab device, such as a smart phone or touch screen display, as non-limiting examples. Alternately, in agricultural machines having autonomous capability, the directions from the planner or dispatch algorithm 90 may be delivered directly to autonomous control systems governing the movements and actions of the agricultural machines, in this case the combines 24A, 24B, 24C, and 24D and the haul vehicle or chaser carts 28A and 28B.

The planner or dispatch algorithm 90 divides the field or fields 10 into lands represented in FIG. 1 as 16A, 16B, and 16C, as well as at least one headland 12 that surrounds the lands 16A, 16B, and 16C. The lands 16A, 16B, and 16C, and the headlands 12 are further divided into logical chunks of work made up of sets of swaths 14, the swaths 14 being further made up of groups of rows 30 that the combines 24 can harvest in a single pass. Initially, each combine 24A, 24B, 24C, and 24D is assigned to a logical chunk of work or swath 14, initially starting within the headlands 12. As the combines 24A, 24B, 24C, and 24D proceed through unharvested areas 20, they leave behind harvested areas 18 that are accessible to the haul vehicle or chaser carts 28A and 28B. Once all of the swaths 14 within the headlands 12 of a field or fields 10 are harvested or being harvested by other combines, further available combines, in this case 24C and 24D, are assigned to logical chunks of work or swaths 14 within one of the lands 16A, 16B, and 16C. Preference is given to logical chunks of work or swaths 14 within a land 16A, 16B, or 16C that can be harvested by the combines by moving in a direction placing the unloading system 26 of the combine adjacent to a harvested area 18, the harvested area 18 being either in a previously harvested swath 14 within a headland 12 or in a previously harvested swath 14 within a nearby land 16A, 16B, or 16C. In this way, further available combines, in this case 24C and 24D, are preferentially assigned to harvest swaths 14 wherein the combine can unload while continuing to harvest, or "unload on the go,"

which is also coordinated between the combines 24A, 24B, 24C, and 24D and the haul vehicle or chaser carts 28A and 28B by the planner or dispatch algorithm 90.

If no swath 14 is available to assign to a further available combine that can be harvested by moving in a direction placing the unloading system 26 of the combine adjacent to a harvested area 18, then the next available land is assigned to the further available combine to "open". In the field 10 shown in FIG. 1, the lands 16A, 16B, and 16C are shown each including four swaths 14 having rows 30. However, four swaths 14 in each land 16A, 16B, and 16C are chosen simply for illustrative purposes, it being understood that lands 16A, 16B, and 16C may include more or less rows, typically seven or eight rows 30. When an agricultural machine, in this case one of combines 24A, 24B, 24C, or 24D, is directed by the planner or dispatch algorithm 90 to begin work on a logical chunk of work or swath 14 within a new land 16A, 16B, or 16C of the field 10, the planner or dispatch algorithm 90 directs the combine 24A, 24B, 24C, or 24D to work a logical chunk of work or swath 14 down the approximate center of the newly opened land 16A, 16B, or 16C. The combine or combines 24A, 24B, 24C, or 24D then works outward from the center of the land 16A, 16B, or 16C, so that the unloading system 26 is directed towards the already harvested swath or swaths 14.

It is not uncommon that a combine, such as combine 24D in FIG. 1, may therefore have entered a logical chunk of work or swath 14 in a land such as 16B wherein the unloading system 26 of the combine 24D is adjacent to an unharvested area 20, which is inaccessible to the haul vehicle or chaser carts 28A and 28B. It is also not uncommon that such combine 24D may then require unloading in order to prevent overfilling and grain loss through spillage. In this circumstance, the planner or dispatch algorithm 90 then directs the combine 24D to back up and harvest an additional space to create an impromptu unloading area or cutout 22. The impromptu unloading area or cutout 22 allows the haul vehicle or chaser cart 28A to approach the combine 24D for unloading, and gives the haul vehicle or chaser cart 28A space to turn around. The impromptu unloading area or cutout 22 may extend to the beginning of the swath 14 in which the combine 24D is located. However, in large fields with long swaths, such impromptu unloading area or cutout 22 may be distant from the beginning of the logical chunk of work or swath 14 in which the combine 24D is located, requiring the haul vehicle or chaser cart 28A to follow the harvested area 18 behind the combine 24D for some distance before entering the impromptu unloading area 22. Such an impromptu unloading area or cutout 22 may be created within a swath 14 of a headland 12 or within a swath 14 of a land 16A, 16B, or 16C. The planner or dispatch algorithm 90 is aware of the location of other agricultural machines and coordinates the movement of the combines 24A, 24B, 24C, and 24D and the haul vehicle or chaser carts 28A and 28B to avoid interference between vehicles.

The planner or dispatch algorithm 90 is further capable of adjusting to changes and interruptions, reassigning the combines 24A, 24B, 24C, and 24D and the haul vehicle or chaser carts 28A and 28B as necessary. Such reassignments may be needed due to additional agricultural machines 24A, 24B, 24C, or 24D becoming available, such as from other fields where work has been completed, or due to agricultural machines becoming unavailable, such as because of breakdown or simply the need for haul vehicle or chaser carts 28A and 28B to leave the field to deliver the crop to storage. Further, the planner or dispatch algorithm 90 may adjust the assignment of logical chunks of work or swaths 14 within headlands 12 or lands 16A, 16B, or 16C according to the capabilities of the agricultural machines 24A, 24B, 24C, or 24D. For example, combines that are capable of faster operation may be initially assigned to the headlands 12. Alternately, the planner or dispatch algorithm 90 may simply use a first come, first serve type of prioritization. The planner or dispatch algorithm 90 may further iteratively simulate the assignment of logical chunks of work or swaths 14 within the lands 16A, 16B, and 16C of the field or fields 10 to different permutations of available agricultural machines 24A, 24B, 24C, and 24D, in order to determine the most efficient assignment of such logical chunks of work or swaths 14 according to the capabilities of the agricultural machines 24A, 24B, 24C, and 24D. In doing so, the planner or dispatch algorithm 90 may further consider field geometry and/or field conditions.

Figure 2:
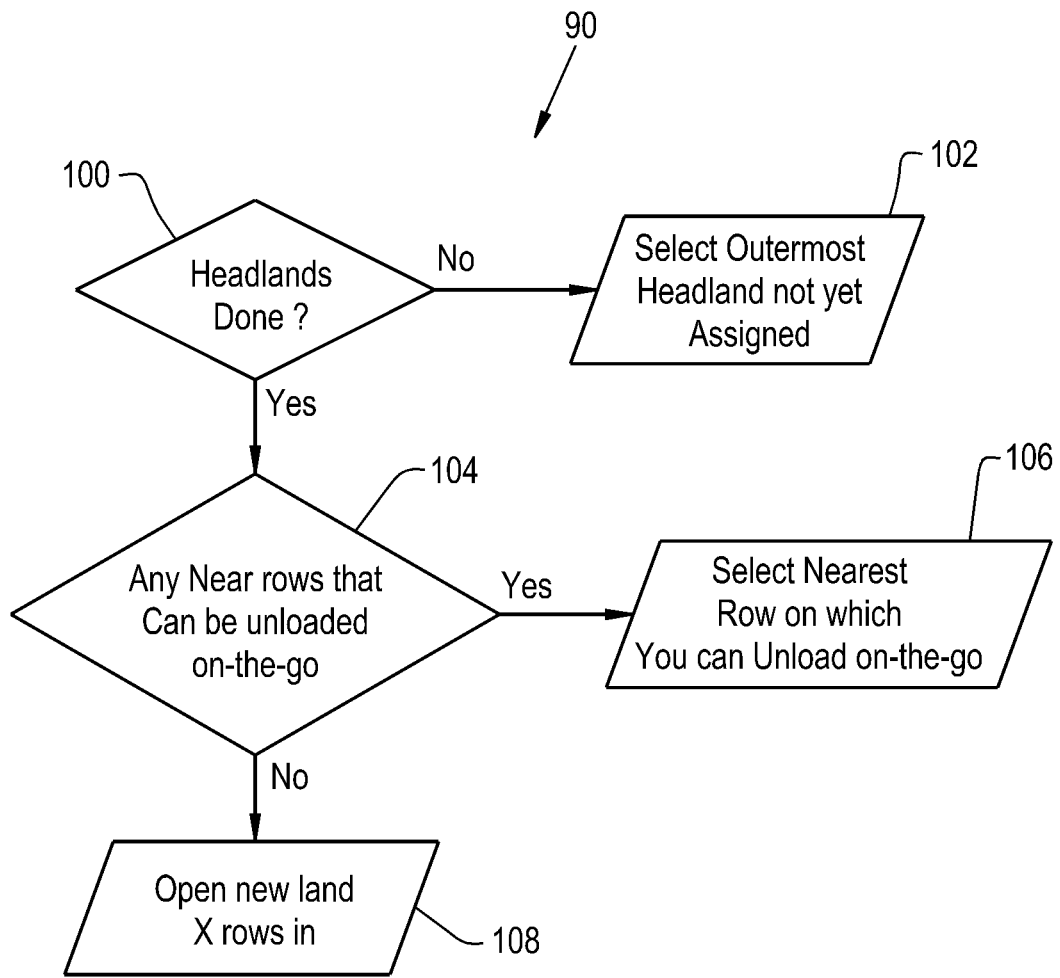
FIG. 2 illustrates a graphical representation of a portion of a planner or dispatch algorithm according to an embodiment of the invention.

Turning now to FIG. 2, a portion of the planner or dispatch algorithm 90 is shown in graphical representation. The planner or dispatch algorithm 90 begins by determining 100 if harvesting of the headlands 12 is complete. If harvesting of the headlands 12 is not complete, the planner or dispatch algorithm 90 selects 102 the outermost logical chunk of work or swath 14 and assigns a combine 24A, 24B, 24C, or 24D to it. Stated differently, if a combine 24A, 24B, 24C, or 24D becomes available, and harvesting of the headlands 12 is not complete, the planner or dispatch algorithm 90 assigns 102 the combine 24A, 24B, 24C, or 24D first to a logical chunk of work or swath 14 within the headlands 12. If harvesting of the headlands 12 is complete, the planner or dispatch algorithm 90 then determines 104 whether a nearby logical chunk of work or swath 14 within a land, such as 16A, 16B, or 16C in FIG. 1, that can be harvested by moving in a direction placing the unloading system 26 of the combine 24A, 24B, 24C, or 24D adjacent to a harvested area 18 is available for harvesting.

If a nearby logical chunk of work or swath 14 within a land 16A, 16B, or 16C that can be harvested by moving in a direction placing the unloading system 26 of the combine adjacent to a harvested area 18 is available for harvesting, the planner or dispatch algorithm 90 selects 106 the next or nearest available combine 24A, 24B, 24C, or 24D to harvest it. In the case of an embodiment of the planner or dispatch algorithm 90 that determines the most efficient assignment of logical chunks of work or swaths 14, the planner or dispatch algorithm 90 selects the available combine 24A, 24B, 24C, or 24D that can most efficiently harvest that particular swath 14 within that particular land 16A, 16B, or 16C to do so. Stated differently, if a combine 24A, 24B, 24C, or 24D becomes available and the logical chunks of work or swaths 14 of the headlands 12 have been or are in the process of being harvested, the planner or dispatch algorithm 90 assigns 106 the combine 24A, 24B, 24C, or 24D giving priority to the nearest logical chunk of work or swath 14 within a land 16A, 16B, or 16C that can be harvested by moving in a direction placing the unloading system 26 of the combine adjacent to a harvested area 18.

If there is not a nearby logical chunk of work or swath 14 within a land 16A, 16B, or 16C that can be harvested by moving in a direction placing the unloading system 26 of the combine adjacent to a harvested area 18 available for harvesting, the planner or dispatch algorithm 90 selects 108 the next or nearest available combine 24A, 24B, 24C, or 24D and assigns it to a logical chunk of work or swath 14 within the next land 16A, 16B, or 16C that is not already being harvested. In the case of an embodiment of the planner or dispatch algorithm 90 that determines the most efficient assignment of logical chunks of work or swaths 14, the planner or dispatch algorithm 90 selects the available combine 24A, 24B, 24C, or 24D that can most efficiently harvest that particular logical chunk of work or swath 14 within that particular land 16A, 16B, or 16C to do so. Stated differently, if a combine 24A, 24B, 24C, or 24D becomes available and the headlands 12 have been or are in the process of being harvested, and there are no nearby logical chunks of work or swaths 14 within lands 16A, 16B, or 16C that can be harvested by moving in a direction placing the unloading system 26 of the combine adjacent to a harvested area 18, only then does the planner or dispatch algorithm 90 assign 108 the next available or most efficiently chosen combine 24A, 24B, 24C, or 24D to a swath 14 within the next land 16A, 16B, or 16C, which cannot be harvested by moving in a direction placing the unloading system 26 of the combine adjacent to a harvested area 18. The newly available combine 24A, 24B, 24C, or 24D is then directed by the planner or dispatch algorithm 90 to begin work on a logical chunk of work or swath 14 within that land 16A, 16B, or 16C that is at the approximate center of the newly opened land 16A, 16B, or 16C. As before, the combine or combines 24A, 24B, 24C, or 24D then work outward from the center of the newly opened land 16A, 16B, or 16C, so that the unloading system 26 is directed towards the already harvested swath or swaths 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for organizing the actions of agricultural machines, comprising:
    a plurality of agricultural machines, each said agricultural machine configured to perform a primary agricultural function in at least one field, each said agricultural machine further comprises an agricultural harvesting machine and said primary agricultural function further comprises harvesting crop;
    a plurality of servicing vehicles, each said servicing vehicle configured to perform a servicing function in connection with at least one agricultural machine of said plurality of agricultural machines on an as-needed basis;
    a computer configured to divide said at least one field into logical chunks of work, said logical chunks of work including a plurality of swaths within at least one headland and a plurality of swaths within at least one land wherein said at least one headland surrounds said at least one land, said computer is further configured to assign each of said plurality of agricultural machines to perform said primary agricultural function upon at least one of said logical chunks of work, wherein said assigning comprises:
        assigning one of said plurality of swaths within said at least one headland to receive said primary agricultural function by a first unassigned agricultural machine of said plurality of agricultural machines;
        determining whether any of said plurality of swaths within said at least one headland have not been assigned to receive said primary agricultural function by one of said plurality of agricultural machines;
        responsive to a determination that one of said swaths within said at least one headland has not been assigned to receive said primary agricultural function, assigning a next unassigned agricultural machine of said plurality of agricultural machines to perform the primary agricultural function on said swath within said at least one headland that had not been assigned to receive said primary agricultural function; and
        responsive to a determination that all of said swaths within said at least one headland have been assigned to receive said primary agricultural function, assigning said next unassigned agricultural machine of said plurality of agricultural machines to perform said primary agricultural function on one of said swaths within said at least one land surrounded by said at least one headland, comprising:
            determining whether one of said swaths within said at least one land is adjacent to an area that has already received said primary agricultural function;
            responsive to a determination that said one swath of said plurality of swaths within said at least one land is adjacent to said area that has already received said primary agricultural function, assigning said one swath of said plurality of swaths that is adjacent to said area that has already received said primary agricultural function to receive said primary agricultural function by said next unassigned agricultural machine; and
            responsive to a determination that none of said swaths within said at least one land is adjacent to said area that has already received said primary agricultural function, assigning one of said swaths located at a center region of said at least one land to receive said primary agricultural function from said next unassigned agricultural machine.

2. The system of claim 1, wherein:
each said servicing vehicle further comprises a grain cart or haul vehicle; and
said servicing function further comprises unloading each said agricultural harvesting machine into each said grain cart or haul vehicle.

3. The system of claim 1, wherein:
said computer is further configured to assign at least one agricultural machine of said plurality of agricultural machines to create an impromptu servicing area by performing said primary agricultural function therein, after which a respective at least one servicing vehicle of said plurality of servicing vehicles can perform said servicing function in connection with said at least one agricultural machine in said impromptu servicing area, when:
    said at least one agricultural machine is within one of said swaths in which said at least one agricultural machine cannot perform said primary agricultural function in such an orientation that said at least one servicing vehicle can otherwise perform said servicing function in connection with said at least one agricultural machine by way of said at least one servicing vehicle passing over an area that has already received said primary agricultural function; and
    said at least one agricultural machine requires said servicing function.

4. The system of claim 1, wherein:
said computer is further configured to determine an assignment of each agricultural machine of said plurality of agricultural machines to perform said primary agricultural function upon said logical chunks of work according to at least one of individual capacities of said agricultural machines, field conditions, and a field geometry.

5. The system of claim 4, wherein:
said computer is further configured to iteratively simulate the assignment of said logical chunks of work to different permutations of said agricultural machines as said agricultural machines are available, and to determine an efficient assignment of said logical chunks of work to said available agricultural machines.

6. The system of claim 1, wherein:
said computer is located on at least one agricultural machine of said plurality of agricultural machines.

7. The system of claim 1, wherein:
said computer is further configured to receive status information from at least one agricultural machine of said plurality of agricultural machines and from at least one servicing vehicle of said plurality of servicing vehicles.

8. The system of claim 1, wherein:
said computer is further configured to provide assignment information to the operator of each said agricultural machine by way of an interface.

9. The system of claim 1, wherein:
said computer is configured to provide assignment information directly to an autonomous control system of each said agricultural machine.

10. A computer-implemented method for organizing the actions of agricultural machines within a field including at least one headland and at least one land surrounded by said at least one headland, comprising the steps of:
providing a plurality of agricultural machines, each said agricultural machine configured to perform a primary agricultural function in said field, said primary agricultural function comprising harvesting crop, and a computer in communication with each said agricultural machine;
identifying a plurality of swaths within said at least one headland and a plurality of swaths within said at least one land;
assigning one of said swaths within said at least one headland to receive said primary agricultural function by a first unassigned agricultural machine of said plurality of agricultural machines;
determining whether any other of said swaths within said at least one headland have not been assigned to receive said primary agricultural function by one of said agricultural machines;
responsive to a determination that one of said swaths within said at least one headland that has not been assigned to receive said primary agricultural function, assigning a next unassigned agricultural machine of said plurality of agricultural machines to perform the primary agricultural function on said swath within said at least one headland that had not been assigned to receive said primary agricultural function; and
responsive to a determination that all of said swaths within said at least one headland have been assigned to receive said primary agricultural function, assigning said next unassigned agricultural machine of said plurality of agricultural machines to perform said primary agricultural function on one of said swaths within said at least one land surrounded by said at least one headland, comprising:
determining whether one of said swaths within said at least one land is adjacent to an area that has already received said primary agricultural function;
responsive to a determination that one of said swaths within said at least one land is adjacent to said area that has already received said primary agricultural function, assigning said swath that is adjacent to said area that has already received said primary agricultural function to receive said primary agricultural function by said next unassigned agricultural machine; and
responsive to a determination that none of said at least one swaths within said at least one land is adjacent to said area that has already received said primary agricultural function, assigning one of said swaths located at a center region of said at least one land to receive said primary agricultural function from said next unassigned agricultural machine.

11. The method of claim 10, wherein:
said agricultural machines are assigned to perform said primary agricultural function according to at least one of the individual capacities of said agricultural machines, field conditions, and field geometry.

12. The method of claim 11, further comprising:
iteratively simulating the assignment at least one swath within said at least one headland and at least one swath within said at least one land to different permutations of said agricultural machines as said agricultural machines become available; and
determining an efficient assignment of at least one swath within said at least one headland and at least one swath within said at least one land to said available agricultural machines.

13. The method of claim 10, further comprising:
receiving status information from said agricultural machines performing said primary agricultural function.

14. The method of claim 10, further comprising:
providing assignment information to the operator of said agricultural machines by way of an interface.

15. The method of claim 10, further comprising:
providing assignment information directly to an autonomous control system of said agricultural machines.

\* \* \* \* \*